United States Patent Office 3,754,011
Patented Aug. 21, 1973

3,754,011
METHOD FOR THE PREPARATION OF ZIRCONIUM, HAFNIUM AND THORIUM ALKOXIDES
Michael Hoch, 2920 Scioto St.,
Cincinnati, Ohio 45219
No Drawing. Filed Oct. 28, 1970, Ser. No. 84,937
Int. Cl. C07f 7/00
U.S. Cl. 260—429.1   16 Claims

ABSTRACT OF THE DISCLOSURE

A method for preparing metal alkoxides of hafnium, zirconium and thorium in high yields and particularly adapted for large scale operations. The method involves a preparation of metal isopropoxides of the selected metal by the reaction of a metal tetrahalide with isopropyl alcohol under controlled alkaline conditions to form the desired metal tetraisopropoxide in high yields. The metal tetraisopropoxides are then reacted with secondary or tertiary alkanols heavier than isopropanol by alcoholysis exchange to produce the metal tetra secondary or tertiary alkoxides. The metal tetraalkoxides produced are useful as precursor materials in the preparation of fine powders, films and coatings of zirconium, hafnium and thorium oxides in high purity by thermal decomposition. The metal oxides are useful in forming high temperature ceramic bodies, oxidation resistant coatings, absorbants, catalysts and the like.

BACKGROUND OF THE INVENTION

It has heretofore been proposed to prepare isopropoxides of zirconium, hafnium and thorium by reacting the metal tetrachloride with isopropyl alcohol in a benzene reaction medium cooled below room temperature (e.g., about 5° C.) and saturated with ammonia. After the reaction, the ammonium chloride is removed by filtering the cold reaction mixture. The resulting filtrate is concentrated under vacuum to obtain crystals of the metal tetraisopropoxide (for example, the metal tetraisopropoxide isolated is actually a complex which has the composition $Zr(i-OC_3H_7)_4 \cdot i-C_3H_7OH$, rather than $$Zr(i-OC_3H_7)_4).$$

The metal tetraisopropoxide reaction product is then further purified by recrystallization from hot isopropyl alcohol.

The yields of the metal tetraisopropoxides produced by this method of the prior art are very low, i.e., on the order of about 10-25% based upon the metal tetrachloride employed. In fact, it is not uncommon for a 2 to 3 kilogram charge of the metal tetrahalide to produce very small quantities of desired metal tetraisopropoxide, even as little as 5-10 grams after the preparation, isolation and recrystallization of the desired product.

The higher carbon atom-containing metal alkoxides such as secondary or tertiary butoxide, pentoxide (amyloxide), hexoxide, heptoxide and the like have not been made quantitatively directly from the metal tetrahalides. For example, original prior art work revealed that when t-butyl alcohol is added to zirconium tetrachloride in attempts to directly prepare zirconium tetra-t-butoxide, the primary products formed are zirconium hydroxide and t-butyl chloride rather than the intended zirconium tetra-t-butoxide. This necessitated the preparation of heavier secondary or tertiary alkoxides indirectly by the above discussed technique of first preparing the zirconium tetraisopropoxide and then exchanging the isopropoxide radical with a higher secondary or tertiary alkoxide radical by alcoholysis. The zirconium tetraisopropoxide is by no means inert to hydrolysis, but it is more stable than tertiary alkoxides containing more than three carbon atoms in the alkyl chain, e.g., butyl, amyl, hexyl, heptyl and the like. The known indirect method for the alcoholysis exchange of isopropoxide radicals with higher alkoxide radicals gives extremely poor yields based upon metal tetrahalide starting material and requires that the exchange reaction be conducted after crystals of zirconium tetraisopropoxide have been isolated and recrystallized. Further, in the exchange reaction according to prior art techniques, some of the isopropyl alcohol formed in the exchange would re-exchange with the desired zirconium higher alkoxide and additionally reduce yields.

Accordingly, in summary, in the past it has been extremely difficult to prepare in good yields, either zirconium, hafnium and thorium tetraisopropoxides or the higher secondary or tertiary alkoxides of these metals by alcoholysis exchange. Both the method of preparing the metal isopropoxides or the higher alkoxides have heretofore only been capable of producing yields at best on the order of about 10-25% by weight of the starting metal tetrahalides. The main reasons for their difficult preparation are the same as the reasons that they are useful in the preparation of zirconia, hafnia, or thoria, namely, these metal alkoxides are susceptible to hydrolysis or degradation which is taken advantage of, for example, in the preparation of high purity metal oxides according to the following ideal equations for the tertiary alkoxide:

$$Zr(t\text{-}OAlkyl)_4 + 4H_2O \longrightarrow Zr(OH)_4 + 4t\text{-}Alkyl\text{-}OH$$

and

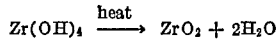

SUMMARY OF THE INVENTION

This invention is directed to a method for producing isopropoxides of a metal selected from the group consisting of hafnium, zirconium and thorium from the corresponding metal tetrahalides in exceedingly high yields on the order of about 90%, or more. Moreover, this invention permits the production of higher secondary or tertiary alkoxides of the selected metals by exchange with the metal isopropoxides in yields on the order of about 60-85% by weight based upon the starting metal tetrahalides.

This invention is predicated in part upon the discovery that exceedingly high yields of hafnium, zirconium and thorium isopropoxides can be obtained by reacting a metal tetrahalide of the selected metal with isopropyl alcohol in an alkaline reaction medium having a pH in the range of about 8-11 and maintaining this pH during the course of the reaction. Empirically it has been determined that this technique of controlling the pH within this range preferably at a mid-point of about 9 during the reaction of the metal halide with the isopropyl alcohol produces yields on the order of about 90% by weight metal tetraisopropoxide.

The exact mechanism for the unexpectedly advantageous degree of success in the method according to this invention cannot be set forth precisely. It has been found according to this invention that at the beginning of the reaction of the metal tetrahalide with the isopropyl alcohol, the pH of the alkaline reaction medium may be fairly high, perhaps, i.e., above a pH of about 11. Then as more metal tetrahalide enters the reaction, the pH moves towards acidity. This tendency of the reaction medium to be driven towards acidity causes apparently a number of side or less preferred reactions to occur which either prevent desired metal isopropoxide formation, decompose the metal isopropoxide which has been formed or promote the production of organic polymeric or resinous materials.

Whatever the theory or mechanism involved according to this invention, it has been found essential to the obtainment of high yields of zirconium, thorium and hafnium tetraisopropoxides according to this invention, that the pH of the reaction medium be controlled during the course of the reaction within a pH range of about 8–11, preferably around 9. Above or below this range, undesired reactions and degradation of desired product occur.

The advantages of the technique for preparing the metal isopropoxide of the selected metal according to this invention are further realized by the conversion of the metal isopropoxide to a higher secondary or tertiary alkoxide. Employing the technique for the preparation of the isopropoxide according to this invention followed by alcoholysis of the isopropoxide with an alcohol selected from the group consisting of tertiary or secondary alkanols having a carbon content of 4 or greater such as butyl, amyl, hexyl, heptyl up to decyl, for example $C_5$–$C_{10}$ alkanols, produce yields generally on the order of 60–85% by weight or at least about 50–70% by weight based upon the metal tetrahalide starting material. Greater yields of 80–85% have been obtained for zirconium higher alkoxides than for hafnium alkoxides (60–70% by weight) or for thorium alkoxides (50–70% by weight) according to present practice of the invention. Such high yields have heretofore been unachievable. Moreover, in accordance with preferred techniques involved in the refinements of this invention which will be dealt with later in this description, distinctly advantageous and different steps are employed which offer savings in time, materials and eliminate operations heretofore felt necessary in prior art methods.

The method of preparing the isopropoxide of the selected hafnium, zirconium and thorium metals as well as the subsequent exchange reaction with higher alkanols is conducted under substantially anhydrous conditions. The necessity for more complete anhydrous conditions will vary depending upon whether Zr, Hf or Th metal alkoxides are being prepared. Generally, more completely anhydrous conditions are required for hafnium than for zirconium and, in turn for thorium. However, in order to define a general guide, "substantially anhydrous" in its context here means free from water moisture content of about 0.01% or better. This specification is not intended to be precise but rather it indicates the reaction medium should be anhydrous due to the susceptibility of the metal alkoxides to hydrolysis. In addition, the alkaline reaction medium within which the metal tetrahalide is reacted with the isopropyl alcohol desirably contains a solvent for the metal isopropoxide which is being formed during the reaction other than the isopropanol reactant. The isopropyl alcohol reactant alone even when employed in a normal excess does not practically function as solvent for the metal isopropoxide at reaction temperatures (which are according to this invention on the order of about 45–55° C.) for the purpose of preventing its co-mingling with the $NH_4Cl$ solids by-product. A hydrocarbon solvent of either the aromatic or straight- or branched-chain paraffinic type is preferred. Such a hydrocarbon solvent assists in the maintenance of anhydrous conditions and solvates the reaction product during the course of the reaction in preference to ammonium chloride by-product which is being formed. Typical hydrocarbon solvents include benzene, toluene of the aromatic type and normal hexane of the straight- or branched-chain paraffinic type. Preferably, the hydrocarbon solvent has relatively low atmospheric boiling point in the range of about 55° C. to about 85° C. to facilitate its distillation from the reaction product at a low enough temperature to prevent either the degradation of the desired isopropoxide, or if removed after the exchange reaction, of the higher secondary or tertiary alkoxide. Yet the atmospheric boiling temperature of the hydrocarbon solvent must not be too much lower than about 55° C. or it will tend to vaporize and interfere with the atmospheric production of the metal isopropoxide. Benzene has been used in the preferred technique of this invention because of its availability, cost, boiling point, solvent capability and azeotropic boiling nature with isopropanol which assists in the removal of excesses of the latter reactant when desired. But, the use of benzene is not to be considered an essential limitation on the process of this invention and other hydrocarbon solvents of the type mentioned can be employed.

The temperature conditions of the reaction of the metal halide with isopropanol will depend upon the particular isopropanol-solvent media, but the general considerations which control temperature of the reaction include the desire to promote the desired reaction to metal isopropoxide, to avoid prolonged higher temperatures which would degradate the isopropoxide formed, to avoid volatilization of the reaction media solvent or isopropanol or ammonia from the medium which deters suitable performance of the reaction, to keep the desired reaction product in solution during the course of the reaction, among other obvious ones. These considerations are met for all three reactions of Zr, Th and Hf halides by employing reaction temperatures on the order of about 45–55° C. in benzene-isopropanol media containing ammonia alkaline agent as in the subsequently described preferred embodiments, but such a temperature range is not critical to the performance of this invention in its broader aspects with the use of other solvents or alkaline agents.

In employing my inventive technique, it has been found unnecessary to cool the reaction medium below room temperature as suggested heretofore in the prior art technique. The maintenance of reaction control at a pH of about 8–11 has been found to eliminate the need to cool. This elimination of the cooling step is a significant saving in economies. Moreover, lack of the need to cool exemplifies the absence of undesirable solubilized ammonium chloride in the desired reaction product according to this invention which will degenerate the desired reaction product. Another advantage of the controlled pH method of this invention is that it permits metal isopropoxide to be isolated under atmospheric pressure rather than under vacuum heretofore suggested by the prior art. The prior art method of distillation under vacuum was necessary to prevent decomposition of the isopropoxide produced. Vacuum distillation for removal of isopropanol-solvent mixture to concentrate the product is not required according to the method of this invention. Moreover, the prior art techniques have produced such a crude metal isopropoxide that before further alcoholysis with a higher tertiary or secondary alkanol could be conducted, the isopropoxide was crystallized and, as mentioned, purified by recrystallization. However, according to this invention, no isolation of the crystalline metal isopropoxide is necessary prior to a further reaction of the metal isopropoxide with the higher secondary or tertiary alcohol for exchange therewith to produce the metal secondary or tertiary alkoxide.

The preferred technique of maintaining the pH during the reaction of the metal tetrahalide with isopropyl alcohol according to this invention is conducted by introducing controlled amounts of either the metal halide or alkaline reagents such as ammonia gas into the isopropyl alcohol reaction medium during the course of the reaction. For example, preferably, the mixture of isopropyl alcohol and benzene (solvent for the metal isopropoxide) is rendered alkaline by the addition of dry ammonia gas until a pH on the order of about 9 is reached. Then, a controlled amount of dry ammonia gas can be introduced over the course of the reaction in a steady stream to maintain the level of pH at about 9. When the metal tetrahalide causes the pH of the reaction medium to drop towards the acid level, metal tetrahalide addition is interrupted until the pH again rises to about 9. Accordingly, by the control of either or both of the metal halide or ammonia gas, the pH of the reaction medium is maintained within the range of about 8 to about 11. Similarly, if the alkaline reaction medium tends towards a level above a pH of about 11 where the solubility of the ammonium chloride in the reaction product would be enhanced, then the amount of ammonia gas being introduced can be reduced to lessen the basicity of the reaction medium and bring it within the desired range uopn the continued addition of the metal tetrahalide. The desired level of basicity should be maintained in the reaction medium throughout the course of the reaction, and accordingly, in the most preferred technique, prior to the introduction of any metal tetrahalide for reaction with the isopropyl alcohol, a pH within the desired level is first established. Then, upon the introduction of the metal chloride into the reaction medium, it will react at the desired pH level. If the pH were not established prior to the introduction of the metal chloride into the reaction medium, the undesirable condition of acidity may exist which will tend to cause side reactions and undesirable organic material to form in the reaction medium. Therefore, for the highest possible yields and most preferred operation of this invention, the basicity must be maintained at the reaction outset and during the entire course of the reaction. It will become apparent, however, that having taught a preferred way to maintain the pH range, other ways may become apparent for accomplishing the same result.

After the metal isopropoxide is formed and $NH_4Cl$ removed by filtration, the isopropoxide can be exchanged with a higher secondary or tertiary alkanol such as tertiary-amyl alcohol (t-amyl alcohol). As mentioned, it is not necessary to isolate crystalline metal isopropoxide before proceeding with the alcoholysis reaction of this invention. The filtrate containing the metal isopropoxide, benzene and isopropanol can be reacted as such with the higher alcohols. The use of the filtrate without concentration of product depends principally upon how much excess isopropanol was employed in the isopropoxide reaction and the desirability to shorten the time for performing the desired exchange. The greater the volume of unreacted isopropanol-benzene, the greater the period of time to perform the exchange reaction and to distill off the large volume of isopropanol-benzene during the exchange. Furthermore, it is desirable to remove excess isopropanol from the metal isopropoxide prior to exchange to facilitate the faster reaction rate of the higher secondary or tertiary alkanol with the metal isopropoxide. Accordingly, it is preferred to concentrate the metal isopropoxide product in the filtrate prior to the alcoholysis step. As mentioned, this can be done by atmospheric distillation of isopropanol-benzene from the filtrate until the filtrate reaches a saturation point of metal isopropoxide, i.e., crystals just begin to form therein. This usually occurs at about 25% by weight saturation of the metal isopropoxide in the isopropanol-benzene. Then, the higher alcohol is added to the resulting filtrate for exchange. The exchange reaction is conducted by distillation of the concentrated metal isopropoxide-higher alcohol reaction mixture under atmospheric pressure. The higher alkanols are added in a stoichiometric excess to the concentrated metal isopropoxide for the exchange reaction and the resulting mixture is heated for distillation on a conventional column. During the distillation, any solvent or isopropanol (either present or formed by the exchange) is removed and fractionally distilled as the exchange reaction progresses. At the end of the exchange reaction the higher metal alkoxide reaction product is distilled under vacuum (e.g., 0.1–2 Hg).

It has been found essential, in obtaining maximum conversion of the metal isopropoxide to the desired higher alkoxide, to remove the isopropanol formed by the exchange as fast as possible. The isopropanol, if not removed during the exchange, will re-exchange with the desired higher alkoxide to form the metal isopropoxide and reduce the efficiency and yield of the distillation exchange reaction. In general, it has been found that a distillation column should be operated at a reflux rate which produces rapid separation between the isopropanol produced by the exchange and the metal isopropoxide higher alkanol bottoms reaction mixture. The distillation apparatus which performs this rapid separation forms no part of this invention and in view of the apparatus employed in the following examples it will be understood that other apparatus can suitably be employed. The principal function of this apparatus is to separate the isopropanol from the reaction mixture quickly (and continuously as it is formed in the exchange) while the higher boiling secondary or tertiary alkanols remain in the bottoms mixture or in the refluxing column to condense back down into the bottoms reaction mixture during the exchange. The apparatus may also function to distill over the desired metal higher alkoxide exchanged product from the bottoms reaction mixture later in the distillation. The end result sought here depends upon the design or size of the distillation column, its plates and plate construction, the relative boiling points of the higher alkanols with isopropanol, the heat and pressure history of the distillation, and many factors which have no place for discussion here, but are left to the treatises of the art because they form no part of this invention. With the examples hereinafter provided and the apparatus therein used, the technique of removing the isopropanol during the exchange reaction as rapidly as possible as a by-product of the exchange reaction will be thoroughly understood to enable the person of ordinary skill to practice this invention.

The invention will be further understood with reference to the following specific examples which illustrate the presently preferred embodiments for the preparation of metal alkoxides in accordance with the principles of this invention, it being understood that other variations of these preferred embodiments will become apparent in view thereof.

The reactions and distillations of this invention as illustrated in the following examples were carried out in an all-glass apparatus, fitted with ground glass joints. All operations were performed under dry atmosphere to maintain the substantially anhydrous conditions heretofore mentioned as essential. Commercial grades of the selected metal tetrachlorides were employed in a substantially dry condition. The purity of the zirconium, hafnium or thorium tetrachlorides is not an essential aspect of this invention. The alcohols such as isopropanol and t-amyl alcohols as used in the examples were dried over calcium hydride for several days to assure their substantially anhydrous nature. Similarly, the benzene solvent for the reaction medium was dried over calcium hydride for several days and the ammonia gas was dried with sodium hydroxide, but it is understood that other drying agents could be used.

Example 1.—Preparation of zirconium tetraisopropoxide and zirconium tetra-t-amyloxide Thirty liters of dry benzene and 15 liters of dry isopropyl alcohol were siphoned into a dry 72 liter flask. The ratio of 2 parts of benzene to 1 part of isopropyl alcohol was selected especially because of its azeotropically distillable composition utilized later in the course of this example. The amount of isopropyl alcohol used herein was approximately 5–6 times that stoichiometrically required for the reaction with the zirconium tetrachloride to be later introduced. The flask was cooled by running water and had three inlets. One inlet was fitted with a thermometer, a glass tube to allow for the introduction of ammonia gas, and a positive pressure vent tube. The second inlet was fitted with a stirrer. The third inlet was attached to a motor-driven, funnel-shaped, stainless steel shaker disposed above the flask. Between the bottom of the stainless steel shaker and third inlet there was a horizontal hollow rubber connector which permitted lateral agitation of the shaker for movement of the powder therein from the shaker for controlled addition through the third inlet of the reaction flask.

Dry ammonia gas was passed into the benzene-isopropyl alcohol mixture through the above mentioned glass tube until a pH of 9 was reached in the resulting alkaline reaction medium. The amount of dry ammonia gas introduced to reach the pH of about 9 was on the order of about 0.075–0.15 kg. Zirconium tetrachloride powder (4.6 kg.) was placed in the funnel-shaped shaker for introduction into the flask through the rubber connector between the bottom of the funnel and the third inlet of the reaction flask. At this point, the apparatus and reaction medium was ready for the addition of both the ammonia gas and zirconium tetrachloride. The addition of ammonia gas was controlled at a rate on the order of about 0.75 kg. per hour in a steady stream and the zirconium tetrachloride addition was controlled at a rate on the order of about 2.25 kg. per hour. The ammonia was added in a steady stream but the zirconium tetrachloride addition was adjusted, when necessary, to maintain the pH of the reaction medium at about 9. The temperature of the reaction was maintained at about 45°–55° C., i.e., below 55° C. This temperature, as discussed above, was selected to prevent volatilization of the ammonia and the solvent in the flask so as to avoid contact with zirconium chloride powder being introduced prior to its contact with the reaction medium. This temperature range facilitated the containment of the ammonia gas in the reaction medium to essentially maintain the basicity of the medium for the reaction of the zirconium tetrachloride with the isopropanol. The reaction was conducted under atmospheric pressure conditions. The pH of the solution was checked about every fifteen minutes during the course of the reaction by hydrolyzing a drop of the reaction mixture on pH paper. Precautions were taken to maintain the anhydrous conditions by quick sampling.

After both the total amounts of 4.6 kg. zirconium tetrachloride and 1.5 kg. ammonia were introduced into the reaction flask which occurred in little over two hours, the precipitated ammonium chloride by-product of the reaction was filtered without cooling the reaction mixture to room temperature (which is interpreted to mean about 20–25° C.). A stainless steel Buchner type filter about 1 foot in height and 4 feet in diameter was equipped with a stainless steel top and a valving system to pull the contents of the flask into the filter by vacuum and to carry out the filtration under pressure. Dry nitrogen was used to develop the presure and to maintain the anhydrous conditions of the reaction medium. Ammonium chloride must be removed before the subsequent alcoholysis exchange because it will decompose at about 80° C. and deleteriously affects both the concentration and alcoholysis steps to be performed later in this example.

The filtrate containing zirconium tetraisopropoxide in isopropanol-benzene was then placed in a stainless steel drum. The filter cake was washed with 70 liters of benzeneisopropyl alcohol azeotrope containing two parts of benzene to one part of isopropyl alcohol at 55° C. This assured removal of all product from the reaction. The wash liquid was then added to the filtrate in the stainless steel drum. Then, the contents of the stainless steel drum was transferred gradually to a 72 liter flask and concentrated to a volume of about 20 liters by distillation of the liquid benzene-isopropyl alcohol azeotrope at about 72° C., or in the range of about 70–80° C. representing the minimum and maximum approximate temperatures. The distillation was conducted under one atmosphere pressure until crystals of the zirconium isopropoxide began to form. As mentioned heretofore, the crystals are believed to be presented by the formula

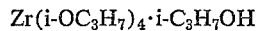

Isolation of the zirconium tetraisopropoxide per se has not been reported. The approximate concentration of the desired product in the benzene-isopropyl alcohol remaining was on the order of about 25% by weight. The concentration is conducted to reduce the excess isopropanol-solvent to facilitate the subsequent exchange reaction to occur at a faster rate. The concentration was conducted with an insulated distillation column 1 foot long, two inches in diameter and having conventional perforated plates spaced apart by about every four inches within the column. The column was operated at about 1 atmosphere. The reaction product did not decompose under these conditions even though vacuum was not used. This points out the importance of the pH control according to this invention and the elimination of an otherwise expensive and time-consuming technique of vacuum distillation.

The yield of zirconium isopropoxide at this point was back-calculated at about 90% by weight of theoretical based upon the zirconium tetrachloride introduced when the amount of zirconium tetra-t-amyloxide recovered in the following alcoholysis step was known. The isopropoxide product of the reaction was not isolated at this point because of the advantages of eliminating this step and accordingly, a direct calculation is not available in this example. The 90% yield of this method is indeed highly unexpected in comparison to the 10–25% yield of the best prior art techniques.

After the concentration of the zirconium tetraisopropoxide-containing filtrate to about 20 liters, 19 liters of dry t-amyl alcohol were added and an exchange reaction carried out. The amount of dry t-amyl alcohol represented an excess on the order of two to three times that required for the exchange reaction stoichiometry. The excess assures solubility of the zirconium tetraisopropoxide during the exchange reaction, prevents decomposition during the alcoholysis and drives the exchange reaction towards completion. The exchange reaction was conducted using an insulated distillation column five feet long, two inches in diameter and having perforated plates of the conventional type spaced apart by every four inches within the column. The column was operated under atmospheric pressure and during the initial heat-up, a small amount of benzene-isopropyl alcohol azeotrope distilled at 72° C. A large fraction containing isopropyl alcohol already present in the system and isopropyl alcohol formed in the exchange reaction distilled at about 80–85° C. The exchange reaction began also at about 80° C. Very little liquid distilled between about 85° C. and 96° C. (This distillate fraction constituted isopropyl alcohol and tertiary amyl alcohol.) During the entire distillation, the column was operated under heavy reflux just short of flooding to facilitate the fast removal of isopropanol formed during the exchange reaction to effect the advantages above discussed. This part of the distillation during the exchange reaction occurred over a period of about three hours. In general, the exchange reaction takes one hour per 1.5 kg. of zirconium isopropoxide used. The excess t-amyl alcohol was then distilled at about 99° C. The zirconium tetra t-amyloxide formed by the exchange reaction distilled at about 125° C. to about 130° C. under vacuum on the order of about 0.1 to 2 mm. using the 1 foot column described earlier. The zirconium tetra t-amyloxide was stored in a sealed, dark-glass bottle under a dry nitrogen atmosphere.

The method described in this example produced yields of zirconium tetra t-amyl oxide ranging from 80% to 87.4% by weight of theoretical in 39 different runs. The yield is calculated on the basis of amount of zirconium tetrachloride used. Approximately 500 grams of dark, gummy residue were left in the flask after the zirconium tetra t-amyloxide was distilled. The residue presumably contained all of the metallic impurities present in the zirconium tetrachloride and did contain some unreacted zirconium tetraisopropoxide. The residue was heated 150° C. and treated with hot isopropyl alcohol. After one recrystallization chloride free, crystalline zirconium tetraisopropoxide was recovered from the filtrate.

Example 2.—Preparation of hafnium tetraisopropoxide and hafnium tetra t-amyloxide The method according to Example 1 was repeated in substantially the same procedural fashion except that hafnium tetrachloride in an amount of 6.5 kg. was substituted for the powdered zirconium tetrachloride. The conditions of the reaction to the isopropoxide and the distillations were about the same, except that the desired hafnium tetra t-amyloxide produced distilled at about 110–120° C. under a vacuum of 0.1 to 2 mm. The method produced yields of halfnium tetra t-amyloxide ranging from 60% to 70% theoretical based upon the hafnium tetrachloride in 18 different runs. A residue of approximately 800 grams was left, on the average, and was characterized in the same manner as was the residue of Example 1.

Example 3.—Preparation of thorium tetraisopropoxide and thorium tetra t-amyloxide The method of Example 1 was repeated in the same detail except that 7.5 kg. of thorium tetrachloride was substituted for zirconium tetrachloride. The preparation of the thorium tetraisopropoxide and the thorium tetra t-amyloxide was identical to the method described in Example 1 except that the distillation of the thorium tetra t-amyloxide produced by the exchange reaction occurred about 70–75° C. under a vacuum of 0.1 to 2 mm. The method of this example produced yields of thorium tetra t-amyloxide ranging from 50 to 70% theoretical based upon the thorium tetrachloride in 8 different runs.

The metal tetrabomides were substituted for the metal chlorides of the above examples and the reactions conducted with similar success. Furthermore, the metal iodides can function in the same manner. Accordingly, the term metal tetrahalide as used herein encompasses chlorides, bromides and iodides with chlorides preferred because of commercial availability. The ammonia reactant, as mentioned, is preferred in achieving anhydrous alkaline conditions of the reaction, but in a broader aspect of this invention other anhydrous alkaline agents such as sodium hydroxide, propylene oxide can be substituted therefor to achieve the same results. The versatility of the solvent has been covered above. On proportions of the reactants in the metal isopropoxide reaction, the isopropanol is preferably in excess, e.g., on the order of about 2 to 6 times that stoichiometrically required, to drive the reaction to completion. Similarly, the higher secondary or tertiary alkanol is used in about the same excess during the exchange reaction. These excesses of alkanols can be removed during the distillation steps. With regard to equivalent higher secondary or tertiary alkanols used in the exchange reaction, other than t-amyl alcohol of the examples, any higher secondary or tertiary alkanol can be exchanged for the isopropoxide as has been used in the past. The exchange reaction can be performed most preferably with $C_4$–$C_{10}$ alkanols to produce alkoxides having particular utility in the production of pure zirconia, thoria, or hafnia and there is no particular commercial advantage in using higher carbon containing alkanols than $C_{10}$ for this purpose. However, the $C_{10}$ secondary or tertiary alkanols do not present an operable upper limit upon the scope of these alkanols which can be used for exchange with the metal isopropoxides. Of course, when other higher alcohols are used, the temperatures and distillation conditions will vary somewhat to compensate for their use.

In view of the above discussion and description of this invention, its various parameters and presently preferred embodiments, other embodiments will become apparent to those of ordinary skill.

What is claimed is:

1. In a method for producing an alkoxide of a metal selected from the group consisting of hafnium, zirconium and thorium from a metal tetrahalide of the selected metal, the improvement which comprises,
   reacting the metal tetrahalide of the selected metal with isopropyl alcohol under substantially anhydrous conditions in an alkaline reaction medium having a pH in the range of about 8 to about 11 to produce a metal tetraisopropoxide, said medium containing a solvent for said metal tetraisopropoxide, and
   maintaining said pH during the reaction.

2. The method of claim 1 wherein the alkaline reaction medium contains ammonia.

3. The method of claim 1 wherein the reaction is conducted by introducing controlled amounts of either said metal halide or an alkaline agent into said reaction medium.

4. The method of claim 2 wherein said solvent comprises a hydrocarbon solvent and the metal tetraisopropoxide reaction product is separated from ammonium halide by-product by filtration.

5. The method of claim 4 wherein the reaction medium is heated to a temperature below the vaporization point of said solvent and the separation is conducted before cooling the reaction mixture to about room temperature.

6. The method of claim 4 wherein said filtration is followed by the atmospheric distillation of the resulting filtrate to concentrate the metal tetraisopropoxide reaction product.

7. The method of claim 4 wherein said hydrocarbon solvent has an atmospheric boiling point in the range of about 55° C. to about 85° C.

8. The method of claim 7 wherein said solvent is benzene.

9. The method of claim 1 which includes the additional step of reacting said metal tetraisopropoxide with an alcohol containing at least four carbon atoms selected from the group consisting of secondary and tertiary alkanols for alcoholysis exchange with said metal isopropoxide to produce a secondary or tertiary alkoxide of said metal.

10. The method of claim 9 wherein said alcoholysis exchange reaction is conducted by atmospheric distillation wherein isopropyl alcohol by-product of the exchange is fast distilled during said alcoholysis exchange.

11. A method for producing an alkoxide selected from the group consisting of tetra- secondary and -tertiary alkoxides of a metal selected from the group consisting of hafnium, zirconium and thorium comprising,
   reacting a metal tetrachloride of the selected metal with isopropyl alcohol under substantially anhydrous conditions in an alkaline reaction medium having a pH in the range of about 8 to about 11 to produce a metal tetraisopropoxide, said medium containing a hydrocarbon solvent for said metal tetraisopropoxide and ammonia,
   maintaining said pH during the reaction by introducing controlled amounts of either said metal tetrachloride or ammonia into the reaction medium during the course of the reaction,
   separating ammonium chloride by-product from the reaction mixture by filtration to produce a filtrate containing said metal tetraisopropoxide,
   concentrating said metal tetraisopropoxide in the filtrate by atmospheric distillation, and
   adding an alkanol having at least four carbon atoms selected from the group consisting of secondary and tertiary alkanols to the concentrated filtrate for alcoholysis exchange reaction with said metal isopropoxide to produce said tetra- secondary and -tertiary alkoxides of the selected metal.

12. The method of claim 11 wherein said reaction of metal tetrachloride with isopropyl alcohol is conducted in a stoichiometric excess of said isopropyl alcohol and said hydrocarbon solvent is a distillable azeotropic forming liquid with said isopropyl alcohol.

13. The method of claim 12 wherein said solvent is benzene.

14. The method of claim 11 wherein the metal tetrahalide with isopropyl alcohol reaction medium is heated to a temperature below the vaporization point of said solvent and said separation of ammonium chloride is conducted before cooling the reaction mixture to about room temperature.

15. The method of claim 11 wherein said alcoholysis exchange reaction is conducted by atmospheric distillation wherein isopropyl alcohol by-product of the exchange is fast distilled during said alcoholysis exchange reaction.

16. The method of claim 14 wherein said alkanol is tertiary amyl alcohol.

References Cited

UNITED STATES PATENTS

| 2,684,972 | 7/1954 | Haslam | 260—429.3 |
| 2,663,720 | 12/1953 | Hill | 260—429.3 |
| 2,977,378 | 3/1961 | Kasper | 260—429.3 |

OTHER REFERENCES

Bradley, "Metal Alkoxides," Metal-Organic Compounds, 1959, Am. Chem. Soc., p. 13.

CARL D. QUARFORTH, Primary Examiner

R. L. TATE, Assistant Examiner

U.S. Cl. X.R.

260—429.3